United States Patent
Alling

[15] 3,644,007
[45] Feb. 22, 1972

[54] HIGH-SPEED ROLLER THRUST BEARING

[72] Inventor: Richard L. Alling, Torrington, Conn.
[73] Assignee: The Torrington Company, Torrington, Conn.
[22] Filed: July 29, 1970
[21] Appl. No.: 59,097

[52] U.S. Cl. ........................................................308/235
[51] Int. Cl. ..............................................F16c 33/64
[58] Field of Search ............................308/235, 217

[56] References Cited

UNITED STATES PATENTS

| | | | |
|---|---|---|---|
| 1,353,044 | 9/1920 | Keiper | 308/235 |
| 2,724,625 | 11/1955 | White | 308/235 |
| 3,240,543 | 3/1966 | Benson | 308/235 |

FOREIGN PATENTS OR APPLICATIONS 1,281,684  12/1961  France....................308/235

Primary Examiner—Edgar W. Geoghegan
Assistant Examiner—Frank Susko
Attorney—David W. Tibbott and Frank S. Troidl

[57] ABSTRACT

A roller thrust bearing including a cage composed of a pair of C-shaped cage members which have slotted faces and pairs of lips extending at right angles from the faces. The two cage members fit together with their lips overlapped and their faces spaced in parallel relationship with a group of bearing rollers having substantially flat ends housed in the cage and seated in the face slots. The face slots are extended radially outward far enough for the outer ends of the rollers to seat on the lips at the outer periphery of the cage without interferring with the rollers.

5 Claims, 3 Drawing Figures

PATENTED FEB 22 1972  3,644,007

INVENTOR
RICHARD L. ALLING
BY
David W. Tibbetts
ATTORNEY

HIGH-SPEED ROLLER THRUST BEARING

BACKGROUND OF THE INVENTION

This invention relates to improvements in roller thrust bearings and more particularly to an improved cage construction for a roller thrust bearing intended for use at relatively high speeds.

A conventional roller thrust bearing is disclosed in the U.S. Pat. No. 2,724,625, issued Nov. 22, 1955 to R. H. White. This bearing includes a cage including a pair of spaced faces containing radial slots surrounding rollers located between the cage faces. The outer ends of the rollers rest on the outer end edges of the slots. When this bearing is used at relatively high speeds, it has been found to suffer from overheating and/or excessive cage and roller end wear. This overheating wear is believed to be caused by the manner in which the outer ends of the rollers are supported to resist the high centrifugal forces caused by high speeds.

SUMMARY OF THE INVENTION

The principal object of this invention is to provide an improved roller thrust bearing that substantially overcomes or minimizes the disadvantages of prior art designs of roller thrust bearings.

Other important objects of this invention are: to provide an improved roller thrust bearing which can be used under relatively high-speed conditions without overheating; to provide an improved roller thrust bearing which provides an increased bearing area relative to its overall size; to provide an improved roller thrust bearing that supports the outer ends of the rollers against large centrifugal forces without overheating and/or excessive cage or roller end wear; and to provide an improved roller thrust bearing which supports the rollers by their outer ends in a more stable manner thereby reducing the rocking or cocking of the rollers in the cage slots that is undesirable because it causes the cage slots to wear too rapidly.

In general, the above objects are attained in a structure including a pair of cage members including slotted faces and overlapping outer lips extending at right angles from the outer peripheral edges of the cage faces. Rollers having substantially flat ends are housed between the cage members and the cage slots are extended radially outward far enough to allow the flat ends of the rollers to rest on the overlapping lips, thereby allowing the lip engaging the roller outer ends to serve as a seat supporting the rollers against centrifugal forces and also reducing the rocking of the rollers in the cage slots. In addition, the slot in the cage member carrying the lip engaging the rollers is extended still further beyond the juncture between the cage face and the lip and into a portion of the lip. The outer edge portion of the other lip is then bent inwardly with portions projecting into the outer ends of the underlying slots to fasten the cage members together and to key them against relative angular displacement.

BRIEF DESCRIPTION OF THE DRAWINGS

The invention is described in connection with the accompanying drawings wherein.

DESCRIPTION OF THE PREFERRED EMBODIMENT

Figure 1:
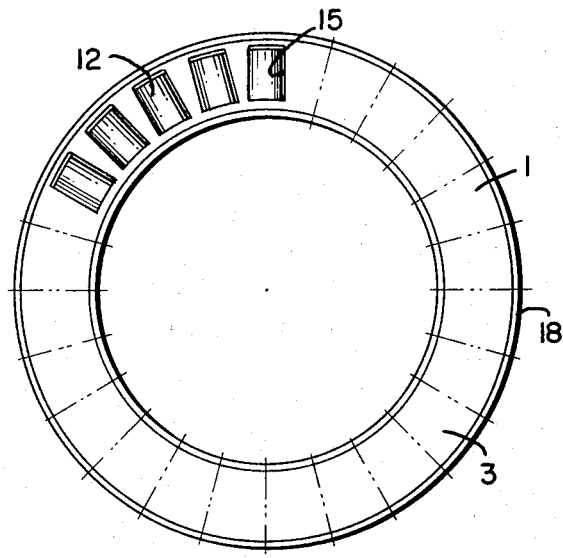
FIG. 1 is a face elevational view of a roller thrust bearing embodying the invention.

The roller thrust bearing shown in the drawings includes a cage 1 composed of a pair of cage members having a C-shaped cross section and including a large cage member 2 and a small cage member 3. The large cage member 2 includes a ring-shaped face portion 4 and inner and outer lips 5 and 6 extending at right angles from the inner and outer peripheral edges of the face portion 4. Likewise, the small cage member 3 includes a face portion 7 and inner and outer lips 8 and 9 respectively. The large cage member 2 is large enough to receive the small cage member 3 with the lips of the two cage members extending toward each other and with the lips 5 and 6 of the large cage member 2 closely interfitting over the lips 8 and 9 of the small cage member 3.

A series of rollers 12 are housed in the cage and fit in slots provided in the face portions 4 and 7 of the cage members. The slots in the large cage member 2 are designated 14 and the slots in the small cage member are designated 15. The two cage members 2 and 3 are aligned in angular relationship to have the slots 14 and 15 in alignment in the axial direction of the bearing. The rollers 12 project through the slots 14 and 15 in a conventional manner to serve as bearing surfaces.

The rollers 12 have substantially flat ends 16, thereby providing substantially the entire length of the roller as a bearing surface. The edges of the rollers 12 between the periphery and the ends 16 carry a small radius as noted in the drawing; this radius will range between 0.005 and 0.015 inches.

The slots 14 and 15 are extended radially outward far enough for the outer ends 16 of the rollers 12 to seat on the outer lip 9 of small cage member without interference from the edges of the slots 14 and 15.

Thus, the lip 9 serves as a relatively wide seat to support the outer ends 16 of the rollers 12 against centrifugal loads caused by centrifugal forces at high rotating speeds of the bearing. Providing a relatively large supporting area for the roller ends 16 distributes the centrifugal loads over a wider area and aids in reducing the rocking or tilting of the rollers 12 in their slots 14 and 15. Past experience has shown that rollers with substantially curved ends tend to rock in their slots which causes unduly rapid wear on the edges of the slots. This invention greatly reduces such slot wear.

Figure 2:
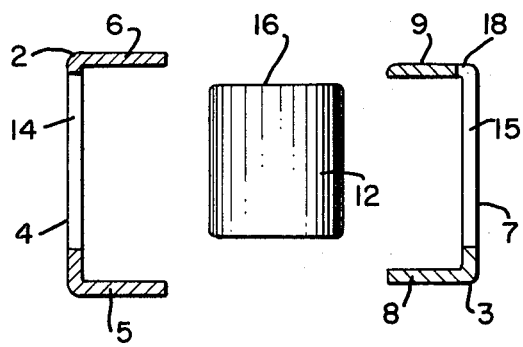
FIG. 2 is an enlarged exploded section of the bearing taken along the axis of a roller.
Figure 3:
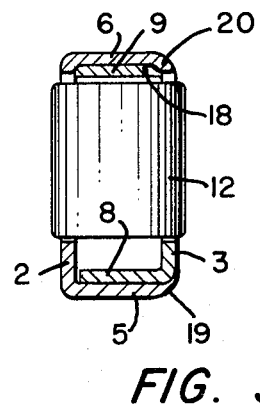
FIG. 3 is an enlarged section taken along the same axis as FIG. 2 and showing the cage members in assembled relationship.

Looking at FIGS. 2 and 3, it will be noted that the outer end 18 of the slot 15 in the small cage member is extended into the lip 9, beyond the juncture of the lip 9 with the face 7. In assembling the bearing, the cage members 2 and 3 are interfitted with the rollers 12 located in the slots and the respective outer edge portions 19 and 20 of the lips 5 and 6 are bent over the small cage member 3 to lock the cage members together. In addition, the edge portion 20 of the lip 6 is bent so that portions project into the outer portions of the slots 15 in the small cage members 3 to key the two cage members 2 and 3 in angular relationship.

While only a single embodiment of the invention is illustrated and described in detail, this invention is not limited merely to the described embodiment, but contemplates other embodiments and variations which utilize the concepts and teachings of this invention.

I claim:

1. A roller thrust bearing comprising:
   a cage including a pair of ring-shaped cage members, each including a radially extending face containing a series of radially extending slots arranged in angularly spaced relationship and a lip extending at generally right angles from the outer peripheral edge of said face;
   said cage members being joined together with their faces in an axially spaced relationship and with said lips interfitting with each other in an overlapped relationship;
   a series of rollers located between said members and fitting in said slots and having substantially flat ends; and
   said slots extending in said faces radially outward sufficiently far enough to allow the outer ends of said rollers to seat on said lips without interference from the edges of said slots.

2. The bearing of claim 1 wherein:
   the cage member carrying the lip engaging the outer ends of the rollers has its slots extended radially outward to the juncture between its face and lip.

3. The bearing of claim 2 wherein:
   the slots extending to said juncture between the face and lip also extend into a portion of the lip.

4. The bearing of claim 3 wherein:

the lip which overlies the slots which are extended into the other lip has its terminal edge bent inwardly with portions projecting into said slots to lock the two cage members relative to each other.

5. The bearing of claim 4 wherein:

said cage members further include interfitting additional lips extending at right angles from the peripheral inner edges of their faces.

* * * * *